A. B. CHAPMAN.
MUD GUARD FOR BICYCLES AND THE LIKE.
APPLICATION FILED MAR. 6, 1917.
1,241,091.
Patented Sept. 25, 1917.
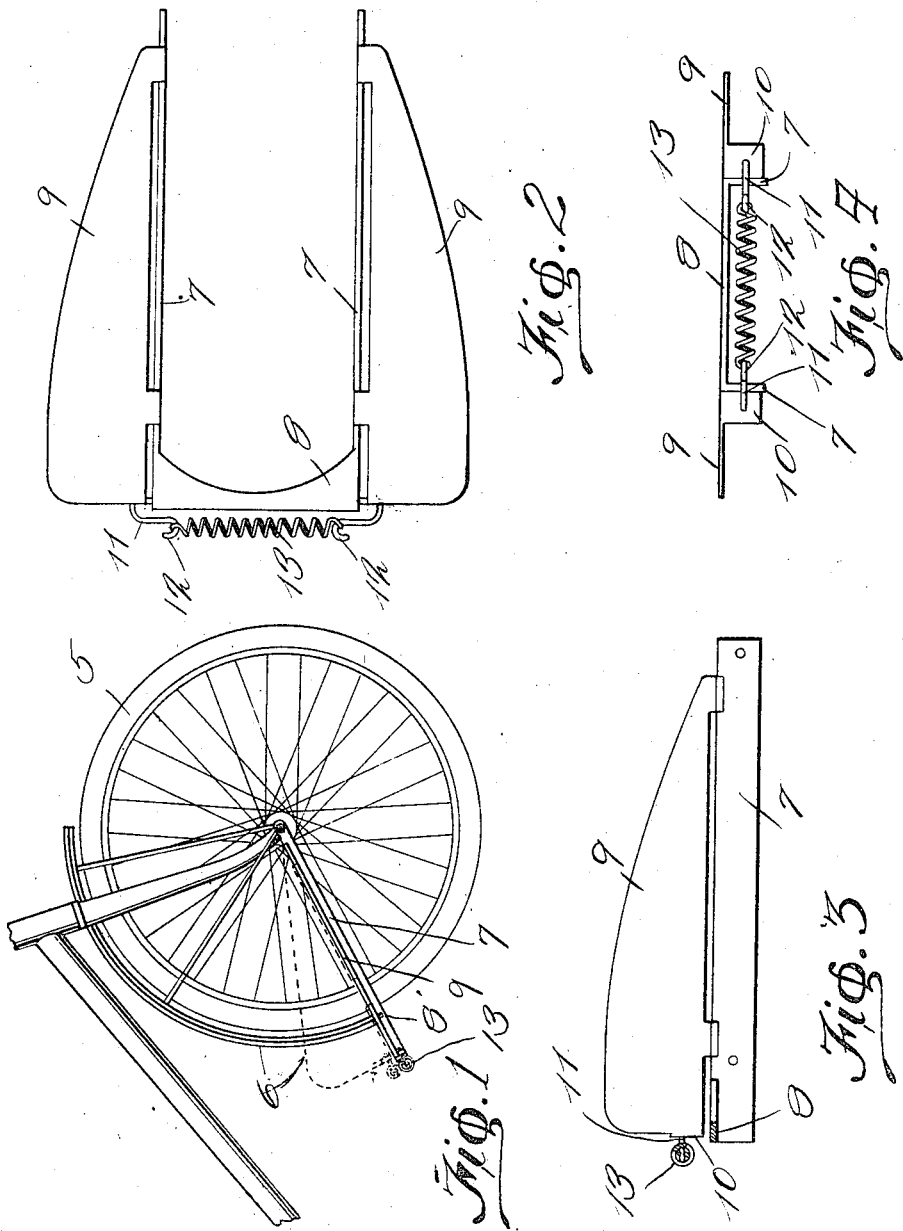
Inventor
A. B. CHAPMAN
Witnesses
W. Moore
E. L. Mueller
By 
Attorneys

UNITED STATES PATENT OFFICE.

ALBERT B. CHAPMAN, OF LOCKPORT, NEW YORK.

MUD-GUARD FOR BICYCLES AND THE LIKE.

1,241,091.  Specification of Letters Patent.  Patented Sept. 25, 1917.

Application filed March 6, 1917. Serial No. 152,697.

*To all whom it may concern:*

Be it known that I, ALBERT B. CHAPMAN, a citizen of the United States, residing at Lockport, in the county of Niagara, State of New York, have invented certain new and useful Improvements in Mud-Guards for Bicycles and the like; and I do hereby declare the following to be a full, clear, and exact description of the invention, such as will enable others skilled in the art to which it appertains to make and use the same.

This invention is an improvement in attachments for bicycles and motorcycles and has particular reference to a mud guard therefor.

An object of the invention is the provision of an auxiliary mud guard which may be attached to a bicycle or motorcycle of ordinary construction and so positioned as to prevent mud and water from being splashed on to the operator by the front wheel of the vehicle.

Another object is the provision of an improved means for retaining the adjustable wings of the mud guard in both operative and inoperative positions.

A further object is the provision of a device of this character which is simple in construction, easy to manufacture and effective in carrying out the purpose for which it is designed.

The inventive idea involved is capable of receiving a variety of mechanical expressions, one of which, for the purpose of illustrating the present invention, is shown in the accompanying drawing, wherein:—

Figure 1 is a fragmentary side elevation of a motorcycle or bicycle of ordinary construction showing the invention applied to the front wheel thereof.

Fig. 2 is a top plan view of the guard.

Fig. 3 is a longitudinal section thereof.

Fig. 4 is a rear elevation.

Referring more particularly to the accompanying drawing the numeral 5 indicates the front wheel of a motorcycle having the usual mud guard 6 extending circumferentially with reference to the wheel.

The mud guard which comprises the essential feature of this invention is shown in what is now believed to be its preferred form and consists of the parallel side members 7 connected at their forward ends to the axle of the wheel 5 and maintained in spaced relation on each side of said wheel by the connecting web 8 at the rear ends thereof. The rear ends of the side members 7 are secured to the lower end of the mud guard 6 by means of bolts 8' so that the entire device will be supported in an inclined position and thus prevent any mud or dirt from being thrown upwardly in the rear of the front wheel. The upper longitudinal edges of the side members 7 each have hinged thereto the adjustable wings or guard members 9 which are preferably of a tapered construction, as best shown in Fig. 2.

These wings or guard members 9, when in operative position, extend in a substantially horizontal plane and in order to yieldably maintain the same in this position the rear ends thereof are provided with the lugs 10 arranged adjacent to and contacting the side members 7 so that further downward movement of the wings or guards is prevented. Each lug has secured thereto one end of an inwardly extending rod 11 having a hook 12 at its other end to which is connected one end of a coil spring 13, the other end of which is secured to the hook 12 of the other rod 11. This spring 13 yieldably resists any upward movement of the wings or guards 9 and is sufficiently strong to prevent the same from being inadvertently thrown upwardly by the force of mud or water contacting against the under side thereof. Should it be desired however, to adjust the wings 9 to an inoperative position it is only necessary to exert sufficient force against the under side thereof to move the same upwardly and also move said spring upwardly until the same is located in a plane above that of the pivots of said wings whereupon said spring will act to draw the wings toward each other into a substantially vertical position as shown by dotted lines.

What is claimed is:—

1. A mud guard comprising side members arranged on each side of a wheel and having their forward ends connected to the axle thereof, wings pivotally connected to said side members and normally extending in a substantially horizontal plane, means carried by each wing for limiting the downward movement thereof, and means connecting the last named means for yieldably maintaining said wings in normal position.

2. A mud guard comprising side members arranged on each side of a wheel and having their forward ends connected to the axle thereof, wings pivotally connected to said side members and normally extending in a substantially horizontal plane, means carried by each wing for limiting the downward movement thereof, and resilient means connecting the last named means for yieldably maintaining said wings in normal position.

3. A mud guard comprising side members arranged on each side of a wheel and having their forward ends connected to the axle thereof, wings pivotally connected to said side members and normally extending in a substantially horizontal plane, means carried by each wing for limiting the downward movement thereof, a rod extending inwardly from each of the last named means, and a spring joining the inner ends of said rods for yieldably maintaining said wings in normal position.

4. A mud guard comprising side members arranged on each side of a wheel and having their forward ends connected to the axle thereof, wing members pivotally connected to said side members and normally extending therefrom in a substantially horizontal plane, lugs carried by said wing members and extending below the plane of the pivots thereof when said wing members are in normal position, and a resilient connection between said lugs for yieldably maintaining said wing members in normal position.

5. A mud guard comprising side members arranged on each side of a wheel and having their forward ends connected to the axle thereof, wing members pivotally connected to said side members and normally extending therefrom in a substantially horizontal plane, lugs carried by said wing members and extending below the plane of the pivots thereof when said wing members are in normal position, said wing members being adapted to be swung about their pivots to a substantially vertical position, and resilient means connecting said lugs for yieldably maintaining said wing members both in normal and vertical positions.

In testimony whereof, I affix my signature in the presence of two witnesses.

ALBERT B. CHAPMAN.

Witnesses:
J. CARL FOGLE,
JAMES J. SULLIVAN.

Copies of this patent may be obtained for five cents each, by addressing the "Commissioner of Patents, Washington, D. C."